US012645651B2

(12) United States Patent     (10) Patent No.:    US 12,645,651 B2

Viswanathan           (45) Date of Patent:      Jun. 2, 2026

(54) USAGE DRIVEN DATA ARCHIVE

(71) Applicant: International Business Machines Corporation, Armonk, NY (US)

(72) Inventor: Seethalakshmi Viswanathan, Cerritos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/631,608

(22) Filed: Apr. 10, 2024

(65) Prior Publication Data

US 2025/0321940 A1     Oct. 16, 2025

(51) Int. Cl.
    *G06F 16/215*      (2019.01)
    *G06F 16/28*       (2019.01)

(52) U.S. Cl.
    CPC .......... *G06F 16/215* (2019.01); *G06F 16/285* (2019.01)

(58) Field of Classification Search
    CPC .............................. G06F 16/215; G06F 16/285
    USPC ........................................................ 707/692
    See application file for complete search history.

(56) References Cited

U.S. PATENT DOCUMENTS

| | | | |
|---|---|---|---|
| 6,481,008 B1 * | 11/2002 | Chaiken .............. | G06F 11/3612 |
| | | | 717/130 |
| 6,499,083 B1 * | 12/2002 | Hamlin ................. | G06F 3/0611 |
| | | | 711/112 |
| 6,931,027 B1 * | 8/2005 | Vogel ...................... | H04L 25/45 |
| | | | 370/477 |
| 7,552,108 B2 * | 6/2009 | Gwizdaloski ......... | G06F 40/177 |
| 9,646,075 B2 * | 5/2017 | Riggs .................... | G06F 16/287 |
| 11,151,078 B2 | 10/2021 | Oberoi et al. | |
| 11,269,888 B1 | 3/2022 | Farooq et al. | |
| 2002/0087824 A1 * | 7/2002 | Hum ................... | G06F 12/1054 |
| | | | 711/E12.063 |
| 2008/0050026 A1 * | 2/2008 | Bashyam .............. | H04N 19/91 |
| | | | 382/238 |

(Continued)

FOREIGN PATENT DOCUMENTS

| | | |
|---|---|---|
| DE | 102021002079 B3 | 5/2022 |
| EP | 2975539 B1 | 12/2019 |

OTHER PUBLICATIONS cloud.ibm.com, "File Storage," Retreived from the Internet: Feb. 20, 2024, https://www.ibm.com/cloud/file-storage/pricing.

*Primary Examiner* — Cam Linh T Nguyen
(74) *Attorney, Agent, or Firm* — Amin, Turocy & Watson, LLP

(57) ABSTRACT

Systems and techniques that facilitate creation and archiving of controlled structures are provided. For example, one or more embodiments described herein can comprise a system, which can comprise a memory that can store computer executable components. The system can also comprise a processor, operably coupled to the memory that can execute the computer executable components stored in memory. The computer executable components can comprise a categorizer component that categorizes a set of data into categories based on respective attributes of subsets of the set of data; a reorganizer component that reorganizes the set of data into a controlled structure based on one or more categories; and a combiner component that combines and delimits entries within one or more segments of the controlled structure.

20 Claims, 10 Drawing Sheets

(56) References Cited

U.S. PATENT DOCUMENTS

| | | | |
|---|---|---|---|
| 2009/0106518 A1* | 4/2009 | Dow | G06F 3/0613 |
| | | | 711/E12.002 |
| 2019/0370170 A1* | 12/2019 | Oltean | G06F 3/0652 |
| 2019/0392053 A1* | 12/2019 | Chalakov | G06F 16/185 |
| 2020/0042634 A1* | 2/2020 | Stewart | G06F 16/278 |
| 2020/0242078 A1* | 7/2020 | Dain | G06F 16/906 |
| 2020/0285391 A1* | 9/2020 | Sun | G06F 3/0649 |
| 2021/0073222 A1 | 3/2021 | Kadiyala et al. | |
| 2022/0214994 A1 | 7/2022 | Narayanan et al. | |
| 2022/0327095 A1 | 10/2022 | Kim et al. | |
| 2022/0374163 A1* | 11/2022 | Colella | G06F 3/0608 |

* cited by examiner

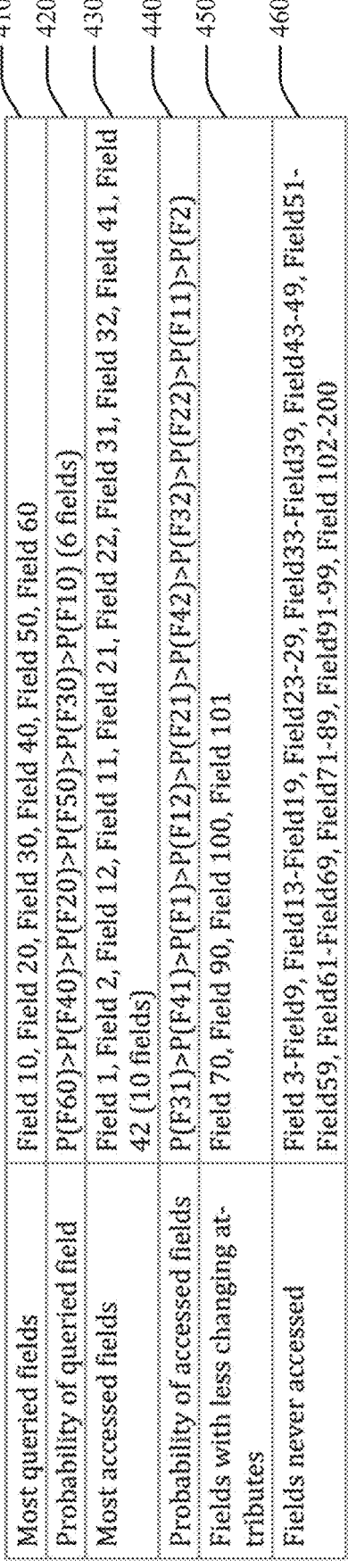

| | |
|---|---|
| Most queried fields | Field 10, Field 20, Field 30, Field 40, Field 50, Field 60 |
| Probability of queried field | $P(F60)>P(F40)>P(F20)>P(F50)>P(F30)>P(F10)$ (6 fields) |
| Most accessed fields | Field 1, Field 2, Field 12, Field 11, Field 21, Field 22, Field 31, Field 32, Field 41, Field 42 (10 fields) |
| Probability of accessed fields | $P(F31)>P(F41)>P(F1)>P(F12)>P(F21)>P(F42)>P(F32)>P(F22)>P(F11)>P(F2)$ |
| Fields with less changing attributes | Field 70, Field 90, Field 100, Field 101 |
| Fields never accessed | Field 3-Field9, Field13-Field19, Field23-29, Field33-Field39, Field43-49, Field51-Field59, Field61-Field69, Field71-89, Field91-99, Field 102-200 |

| Most queried fields | Field Count | 20 Percentile | 40 Percentile | 60 Percentile | 80 Percentile |
|---|---|---|---|---|---|
| QUERIED FIELD | 6 | 1 | 2 | 4 | 5 |
| | | F(60) | F(60),F(40) | F(60),F(40),F(20),F(50) | F(60),F(40),F(20),F(50),F(30) |

600

| Most accessed fields | Field Count | 20 Percentile | 20 Percentile | 20 Percentile | 20 Percentile | 20 Percentile |
|---|---|---|---|---|---|---|
| Access field | 15 | 3 | 3 | 3 | 3 | 3 |
| Segments | | C.Seg-2-0 | C.Seg-2-1 | C.Seg-2-2 | C.Seg-2-3 | C.Seg-2-4 |
| | | F(40),F(20),F(50) | F(30),F(10),F(31) | F(41),F(1),F(12) | F(21),F(42),F(32) | F(22),F(11),F(2) |

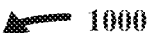
1000

COMPUTER  1001

PROCESSOR SET  1010

PROCESSING CIRCUITRY  1020          CACHE  1021

COMMUNICATION FABRIC  1011

VOLATILE MEMORY  1012

PERSISTENT STORAGE 1013

OPERATING SYSTEM  1022

ARCHIVE GENERATION CODE

1080

PERIPHERAL DEVICE SET  1014

UI DEVICE SET  1023      STORAGE  1024      IoT SENSOR SET  1025

NETWORK MODULE  1015

WAN  1002

END USER DEVICE  1003

REMOTE SERVER  1004

REMOTE DATABASE  1030

PRIVATE CLOUD  1006

GATEWAY  1040

PUBLIC CLOUD  1005

CLOUD ORCHESTRATION MODULE  1041      HOST PHYSICAL MACHINE SET  1042

VIRTUAL MACHINE SET  1043      CONTAINER SET  1044

FIG. 10

USAGE DRIVEN DATA ARCHIVE

BACKGROUND

The subject disclosure relates to archive systems, and more specifically, to utilizing usage data to generate controlled structures for archive storage.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate creation of controlled structures for data archival are provided.

According to an embodiment, a system can comprise a processor that executes computer executable components stored in memory. The computer executable components can comprise a categorizer component that categorizes a set of data into categories based on respective attributes of subsets of the set of data; a reorganizer component that reorganizes the set of data into a controlled structure based on one or more categories; and a combiner component that combines and delimits entries within one or more segments of the controlled structure.

According to another embodiment, a computer-implemented method can comprise categorizing, by a system operatively coupled to a processor, a set of data into categories based on respective attributes of subsets of the set of data; reorganizing, by the system, the set of data into a controlled structure based on one or more categories; and combining and delimiting, by the system, entries within one or more segments of the controlled structure.

According to another embodiment, a computer program product can comprise a computer readable storage medium having program instructions embodied therewith, the program instructions executable by a processor to cause the processor to categorize a set of data into categories based on respective attributes of subsets of the set of data; reorganize the set of data into a controlled structure based on one or more categories; and combine and delimit entries within one or more segments of the controlled structure.

DESCRIPTION OF THE DRAWINGS

FIG. 4 illustrates categorization of a data table in accordance with one or more embodiments described herein.

FIG. 10 illustrates an example, a non-limiting environment for the execution of at least some of the computer code in accordance with one or more embodiments described herein.

DETAILED DESCRIPTION

Figure 1:
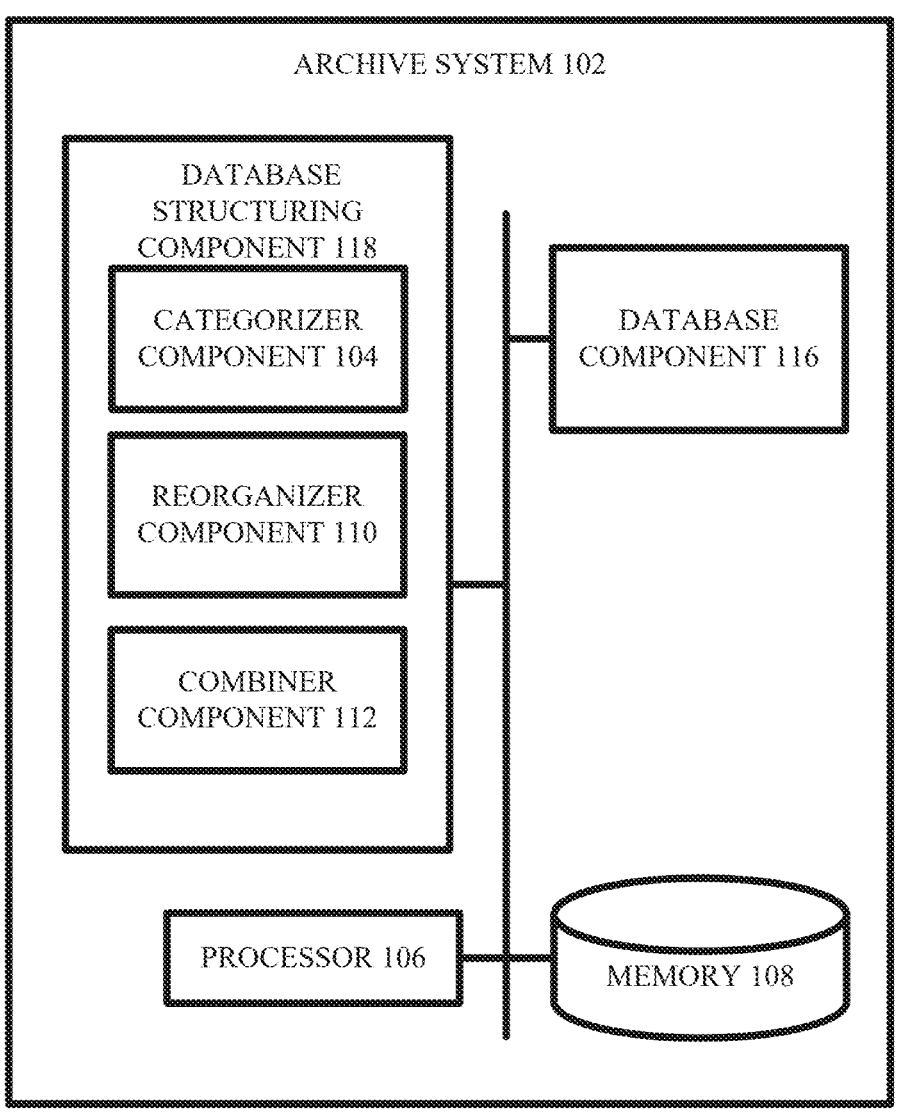
FIG. 1 illustrates a block diagram of an example, non-limiting system that can facilitate generation and archival of controlled structures in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As referenced herein, an "entity" can comprise a client, a user, a computing device, a software application, an agent, a machine learning (ML) model, an artificial intelligence (AI) model, and/or another entity.

Data archives are prevalent across many industries and services. Typically, in data systems, the archiving of data happens "as-is" in on premises or cloud applications, wherein the data is organized into a relational database. Relational databases comprise tables of data entries that pose several challenges during usage such as storage waste and long retrieval times. For example, given 64-bit memory blocks, if storage of a single field of a data table only uses 4 bits of a memory block, but a whole block is dedicated to storing the single field, then 60 bits of storage would be wasted for each field. Furthermore, retrieving data from relational databases is often inefficient as commonly queried or accessed data fields may be in the middle or at the end of data table, requiring much of the table to be parsed to retrieve the field.

In view of the problems discussed above, the present disclosure can be implemented to produce a solution to one or more of these problems by categorizing, by a system operatively coupled to a processor, a set of data into categories based on respective attributes of subsets of the set of data, reorganizing the set of data into a controlled structure based on one or more categories, combining and delimiting entries within one or more segments of the controlled structure and archiving the one or more segments with corresponding data pointers. As used herein "controlled structure" refers to a data structure comprising a plurality of segments, wherein the segments comprise one or more combined and delimited data entries and a pointer to the next segment in the controlled structure. In one or more embodiments, the attributes can comprise a frequently accessed attribute, a frequently queried data attribute, a never accessed attribute, and an infrequently changing attribute. These data usage attributes allow for data entries to be sorted into categories and the segments of the controlled structure are created based on the entries in the categories. Accordingly, entries that have been historically more often queried or accessed can be stored such that they identified faster during a search, thereby improving efficiency in usage of the archive. By combining and delimiting multiple fields into segments that are then stored together, the overall storage waste can be decreased. For example, given 64-bit memory blocks, if storage of a single field of a data table only uses 4 bits of a memory block, multiple fields can be combined and delimited to be stored in a single block, rather than each field being stored in a separate block.

In one or more embodiments, segments of the controlled structure can be linked by pointers to allow for more flexible storage of the controlled structure. For example, a first segment can comprise a pointer that points to a second segment, and the second segment can comprise a pointer that points to a third segment. Accordingly, the segments can be stored on separate memory units within a database or archive system while still being linked through the pointers, allowing for more flexibility in storage of the controlled structure. Furthermore, this allows for the segments to be stored on different types of memory units within the database system. For example, as will be described in greater detail below, the first segment of a controlled structure can comprise fields that are most likely to be queried, while later segments of the controlled structure can comprise fields that are less likely to be queried. Accordingly, the first segment can be stored on a fast or high-performance memory unit to facilitate its frequent access, while the later segments can be stored on lower cost, lower performance memory units, due to the decreased query rates.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates block diagram of an example, non-limiting archive system 102 that can facilitate generation of controlled data structures based on data usage metrics. Aspects of systems (e.g., system 102 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, e.g., computers, computing devices, virtual machines, etc. can cause the machines to perform the operations described. System 102 can comprise database structuring component 118, categorizer component 104, reorganizer component 110, combiner component 112, database component 116 processor 106 and memory 108.

In various embodiments, system 102 can comprise a processor 106 (e.g., a computer processing unit, microprocessor) and a computer-readable memory 108 that is operably connected to the processor 106. The memory 108 can store computer-executable instructions which, upon execution by the processor, can cause the processor 106 and/or other components of the system 102 (e.g., database structuring component 118, categorizer component 104, reorganizer component 110, combiner component 112, database component 116) to perform one or more acts. In various embodiments, memory 108 can store computer-executable components (e.g., database structuring component 118, categorizer component 104, reorganizer component 110, combiner component 112, database component 116), the processor 106 can execute the computer-executable components.

As shown in FIG. 1, database structuring component 118 can comprise categorizer component 104, reorganizer component 110 and combiner component 112. In one or more embodiments, categorizer component 104 can categorize a set of data into categories based on respective attributes of subsets of the set of data. For example, categorizer component 104 can receive a set of data and usage metrics for the set of data from database component 116. In one or more embodiments, the usage metrics can comprise statistics such as how often fields in a data table are queried, how often fields in a data table are accessed, how often fields in a data table are modified, and others. These usage metrics are then used to assign attributes to the fields of the data table. In one or more embodiments the attributes can comprise a frequently accessed attribute, a frequently queried data attribute, a never accessed attribute, and an infrequently changing attribute. Categorizer component 104 can then sort the fields of the table into categories based on the assigned attributes. For example, all fields with the frequently queried attribute will be sorted into a first category, while all fields with the frequently accessed attribute will be sorted into a second category.

The frequently queried data attribute represents data entries or fields that are frequently searched for or queried and can be based on "where" clause statistics, wherein a "where" clause is a filter that specifies criteria that fields must meet to be included in query results from database component 116. Accordingly, in an embodiment, a field can be assigned the frequently queried data attribute if it would be returned by X or more percent of where clauses used, wherein X is a percentage defined by an entity. In another embodiment, the fields can be listed from most often queried to least often queried, and the top X percent of fields can be assigned the frequently queried attribute, wherein X is a percent defined by an entity. In another embodiment, the top X number of fields can be assigned the frequently queried attribute, wherein X is a number defined by an entity. The frequently accessed data attribute is based on entries or fields that are often selected during queries. Accordingly, in an embodiment, a field can be assigned the frequently accessed attribute if it has been accessed during X percentage of queries, wherein X is a percentage defined by an entity. In another embodiment, the fields can be listed from most often accessed to least often accessed, and the top X percent of fields can be assigned the frequently accessed attribute, wherein X is a percent defined by an entity. In another embodiment, the top X number of fields can be assigned the frequently accessed attribute, wherein X is a number defined by an entity. The infrequently changing attribute is based on how often an entry is changed or modified. For example, a data field that is modified relatively infrequently will have the infrequently changing attribute. Accordingly, in an embodiment, a field can be assigned the infrequently changing attribute if it is changed or modified less than X percent of the time, wherein X is a percentage defined by an entity. In another embodiment, the fields can be listed from most often changed to least often changed, and the bottom X percent of fields can be assigned the frequently queried attribute, wherein X is a percent defined by an entity. In another embodiment, the bottom X number of fields can be assigned the infrequently changing attribute, wherein X is a number defined by an entity. The never accessed attribute can represent fields that are rarely or never accessed. Accordingly, in an embodiment, a field can be assigned the never accessed attribute if it has been accessed during less than X percentage of queries, wherein X is a percentage defined by an entity. In another embodiment, the fields can be listed from most often accessed to least often accessed, and the bottom X percent of fields can be assigned the never accessed attribute, wherein X is a percent defined by an entity. In another embodiment, the bottom X number of fields can be assigned the never accessed attribute, wherein X is a number defined by an entity.

In one or more embodiments, reorganizer component 110 can reorganize the set of data into a controlled structure based on one or more categories. For example, segments can be created based on the attributes of the subsets of the set of data, and the subsets can be sorted into the segments based on the categories. In an embodiment, the segments can comprise a first segment, alternatively referred to as C.Seq-1, a second segment, alternatively referred to as C.Seq-2, a third segment, alternatively referred to as C.Seq-3, and a fourth segment, alternatively referred to as C.Seq-4. In one or more embodiments, fields that have the frequently queried data attribute can be sorted into the first segment, fields that have the frequently accessed data attribute can be sorted into the second segment, fields that have the infrequently changing data attribute can be sorted into the third segment, and fields that have the never accessed attribute can be sorted into the fourth segment. In this manner, fields from the data table are reorganized based on the historical usage of the data table (e.g., queries, access, changes, etc.), enabling better optimization of both search operations and how the data is stored.

In one or more embodiments, reorganizer component 110 can further reorganize data fields from one segment to another based on entity specified percentiles for one or more of the categories. For example, an entity can specify that the first segment should comprise only the top X percentile of fields having the frequently quired data attribute. The remaining fields that have the frequently queried data attribute can then be moved to the second segment. This ensures fast and efficient retrieval for the fields that have historically been the most likely to be queried.

In one or more embodiments, one or more segments can be further split into subsegments. For example, the second segment can be split into multiple subsegments (e.g., C.Seq-2-z) wherein z is the number of subsegments. In an embodiment, the number of subsegments can be specified by an entity. For example, given 10 fields in the second category, and that an entity specifies that 2 subsegments should be utilized, reorganizer component 110 can create two subsegments of 5 fields each. In another embodiment, an entity can specify the number of fields that should be stored in a subsegment, and reorganizer component 110 can determine the number of subsegments by dividing the total number of fields in the second segment by the number of fields per subsegment. For example, if the entity specifies that 5 fields should be included in each subsegment and 10 fields in the second category, then reorganizer component 110 can generate 2 subsegments each comprising 5 fields. It should be appreciated that while the example provided above relates to the second category and second segments of the controlled structure, storage of any of the categories as multiple subsegments is envisioned.

In one or more embodiments, combiner component 112 can combine and delimit entries within one or more segments of the controlled structure. For example, delimiter tokens (e.g., characters that indicate a division or break) can be added to the end of the fields within the segments, and then the fields within respective segments can be combined (e.g., concatenated together) to form a controlled segment. This allows for a reduction in overall storage space. For example, given 64-bit memory blocks, typical archive storage would store each data field in its own memory block, even if the memory required to store the field is less than 64 bits, leading to wasted storage. In contrast, by combining fields within the segments into the controlled segments, a segment comprising multiple fields can be stored in a single memory block, thereby decreasing wasted storage. Further, by adding delimiting characters between the fields, the individual fields are still preserved despite the combination. For example, when a segment is parsed as part of a search, the delimiting characters allow for identification of where the individual fields begin and end within the single memory block, thus preserving the individual fields.

In one or more embodiments, combiner component 112 can add pointers to the one or more segments to create a linkage between the segments of the controlled structure. For example, a first pointer can be appended to the first segment which points to the second segment, a second pointer can be appended to the second segment that points to the third segment, and a third pointer can be appended to third segment that points to the fourth category. If the second category is split into subcategories, the pointer of the first category can point to the first subcategory of the second category, wherein respective subcategories comprise pointers pointing to the next subcategory. The final subcategory of the second category can then comprise a pointer that points to the third category. In one or more embodiments, any data that does not have an active pointer pointing to it, can then be purged. Afterwards, combiner component 112 can store the controlled structure in database component 116. In one or more embodiments, different segments of the controlled structure can be stored in different portions of database component 116 or on different forms of memory. For example, as the first category comprises fields that are most likely to be queried, the first category can be stored on memory devices designed for fast and repeated retrieval, whereas the fourth category can be stored on memory devices designed for longer term storage and slower and less frequent retrieval. By converting the data table to a controlled structure, the storage savings are equal to the size of unused space in a memory block when each field is stored separately minus the size of the unused space in a block when combined and stored, then multiplied by the number of total fields stored. Further, by organizing the controlled structure segments in the order described above, fields are organized from most likely to queried and/or accessed to least likely to be queried and/or accessed.

In one or more embodiments, the controlled structure can be periodically updated based on more recent database usage statistics. For example, overtime, changing usage of the database may change how often fields within the controlled structure are queried, accessed and/or modified. Accordingly, a field that is stored in a third segment of a controlled structure (e.g., the segment of infrequently modified fields) may over time become increasingly accessed in comparison to other fields in the controlled structure. Therefore, periodically, fields within the controlled structure can be moved from one segment to another if the attribute they are assigned changes based on updated database usage statistics.

Figure 2:
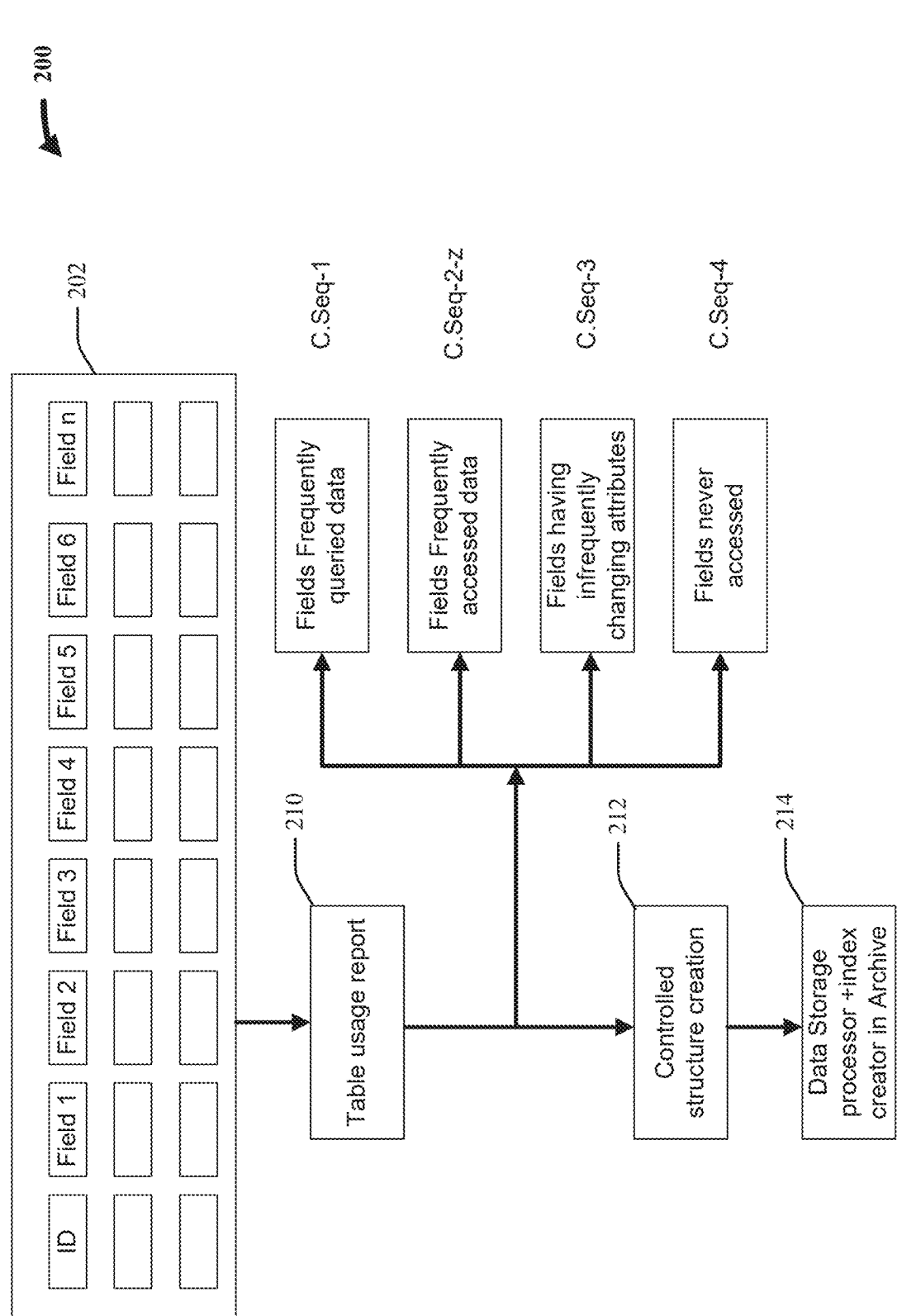
FIG. 2 illustrates an example diagram of creation of a controlled structure in accordance with one or more embodiments described herein.

FIG. 2 illustrates an example diagram 200 of creation of a controlled structure in accordance with one or more embodiments described herein. As shown, data table 202 comprises fields 1-n. Based on prior usage of data table 202, table usage report 210 is created. Table usage report can comprise table usage statistics for the fields in the table. These table usage statistics are then utilized by categorizer component 104 to categorize the fields 1-n into categories for fields frequently queried, fields frequently accessed, fields that are infrequently changed, and fields that are never accessed. These categories are then used as the basis for the creation of four segments, C.Seq-1, C.Seq-2-z, C.Seq-3, and C.Seq-4 by reorganizer component 110. At 212, combiner component 112 combines and delimits the fields within the segments. At 214, the controlled structure is stored in database component 116, wherein pointers are added to link the segments and an index is generated to allow access to the first segment of the controlled structure.

Figure 3:
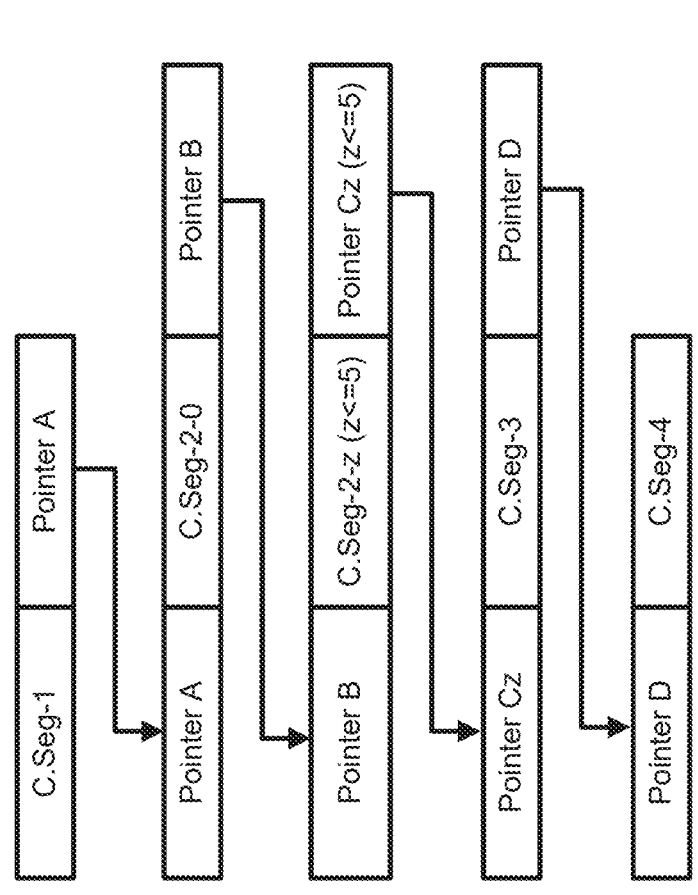
FIG. 3 illustrates an example of a controlled structure in accordance with one or more embodiments described herein.

FIG. 3 illustrates an example of a controlled structure 300 in accordance with one or more embodiments described herein. As shown, controlled structure 300 comprises segments, C.Seg-1, comprising frequently queried fields, C.Seg-2, comprising frequently accessed fields, C.Seg-3, comprising infrequently changing fields, and C.Seg-4, comprising never accessed fields. Furthermore, C.Seg-2 comprises subsegments 0-z. C.Seg-1 comprises pointer A, which points to C.Seg-2-0. C.Seg-2-0 comprises pointer B that points to the next subsegment of segment C.Seg-2. The final subsegment of Seg-2, C.Seg-2-z, comprises pointer Cz that points to segment C.Seg-3. C.Seg-3 then comprises pointer D which points to segment C.Seg-4. Accordingly, when the archive is queried for a field, C.Seg-1 is searched first. As C.Seg-1 has the data fields that have the highest probability of being queried, it is likely the search will find the queried field here and the search can then end. If the field is not in C.Seq-1, then pointer A will lead to C.Seg-2-0 which is then searched. This search process continues until the queried field is found, or all the segments are searched. By organizing the fields in the segments from most likely to be queried to less likely to be queried, future queries are likely to find the search for fields earlier in the search, thereby decreasing overall search time required.

Figure 5:
FIG. 5 illustrates reorganization of fields of a data table in accordance with one or more embodiments described herein.
Figure 6:
FIG. 6 illustrates a chart illustrating the generation of subsegments in accordance with one or more embodiments described herein.

FIGS. 4-6 illustrate details of an example categorization process in accordance with one or more embodiments described herein. Assuming a data table with 200 fields, chart 400 of FIG. 4 illustrates fields of the table categorized as described above in relation to FIG. 1. For example, as shown, fields with the most queried data attribute are sorted into row 410. Row 420 then illustrates the relative probability of being queried of the most queried fields. For example, as shown by row 420, field F60 has the highest probability of being queried. Row 430 illustrates the fields with the most accessed attribute and row 440 illustrates the relative probabilities of the most accessed fields being accessed. For example, field F31 has the highest probability of being accessed. Row 450 illustrates the fields with the infrequently changing attribute and row 460 illustrates the fields with the never accessed attribute.

FIG. 5 illustrates percentile reorganization of fields with the most queried data attribute in accordance with one or more embodiments described herein. As shown, the fields with the most queried attribute can be further organized based on the relative probabilities of being queried from row 420 of chart 400. In chart 500, the fields with the most queried data attribute have been sorted based on 20 percentile divisions. It should be appreciated that the use of any percentile division is envisioned. As field F(60) has the highest relative probability of being selected, it is in the top 20 percentile. As described above in relation to FIG. 1, an entity can specify what percentile of the fields with the most queried data attribute to include in the first segment of the controlled structure. In this example, the fields within the top 20 percentile is placed in the first segment (e.g., C.Seg-1) and the remaining fields will be moved to the second segment.

FIG. 6 illustrates a chart 600 showing the generation of subsegments in accordance with one or more embodiments described herein. As shown, the remaining fields with the most queried attribute and the fields with the most accessed attribute can be divided into percentiles based on the relative probabilities of being accessed. In this example, fields are divided along 20 percentile divisions such that each sub segment will comprise three fields. For example, the first subsegment C.Seg-2-0 comprises fields F(40), F(20) and F(50), the second subsegment C.Seg-2-1 comprises fields F(30), F(10) and F(31), the third subsegment C.Seg-2-2 comprises the fields F(41), F(1) and F(22), the fourth subsegment C.Seg-2-3 comprises fields F(21), F(42) and F(32) and the fifth subsegment C.Seg-2-4 comprises fields F(22), F(11) and F(2).

Figures 7A, 7B:
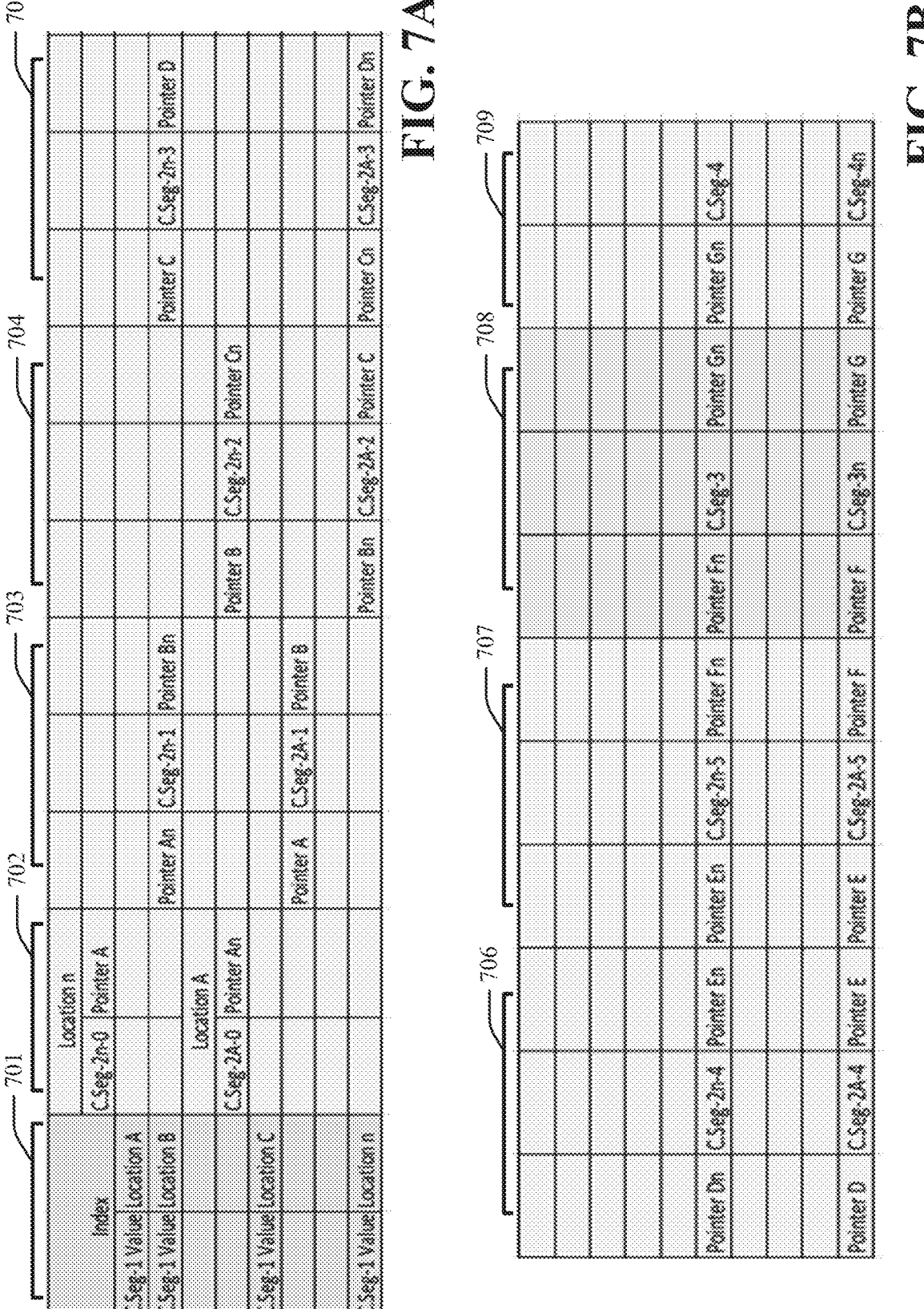
FIGS. 7A and 7B illustrate an example of an archive of a controlled structure in accordance with one or more embodiments described herein.

FIGS. 7A and 7B illustrate an example of an archive of a controlled structure in accordance with one or more embodiments described herein. As shown a first segment C.Seq-1 comprising fields with the frequently queried attribute is stored at 701 with a pointer that points to a first subsegment C.Seq-2n-0 of the second segment comprising fields with the frequently queried attribute, and the first subsegment C.Seq-2n-0 is stored at 702 with a pointer that points to a second subsegment C.Seq-2n-1 at 703. The second subsegment C.Seq-2n-1 has a pointer pointing to a third subsegment C.Seq-2n-2 at 704. The third subsegment C.Seq-2n-2 has a pointer pointing to a fourth subsegment C.Seq-2n-3 at 705. The fourth subsegment C.Seq-2n-3 has a pointer that points to the fifth subsegment C.Seq-2n-4 at 706, which has a pointer to a sixth subsegment C.Seq-2n-5 at 707. The sixth subsegment has a pointer which points to a third segment C.Seq-3 at 708, which has a pointer pointing to the fourth segment C.Seq-4 at 709.

Figure 8:
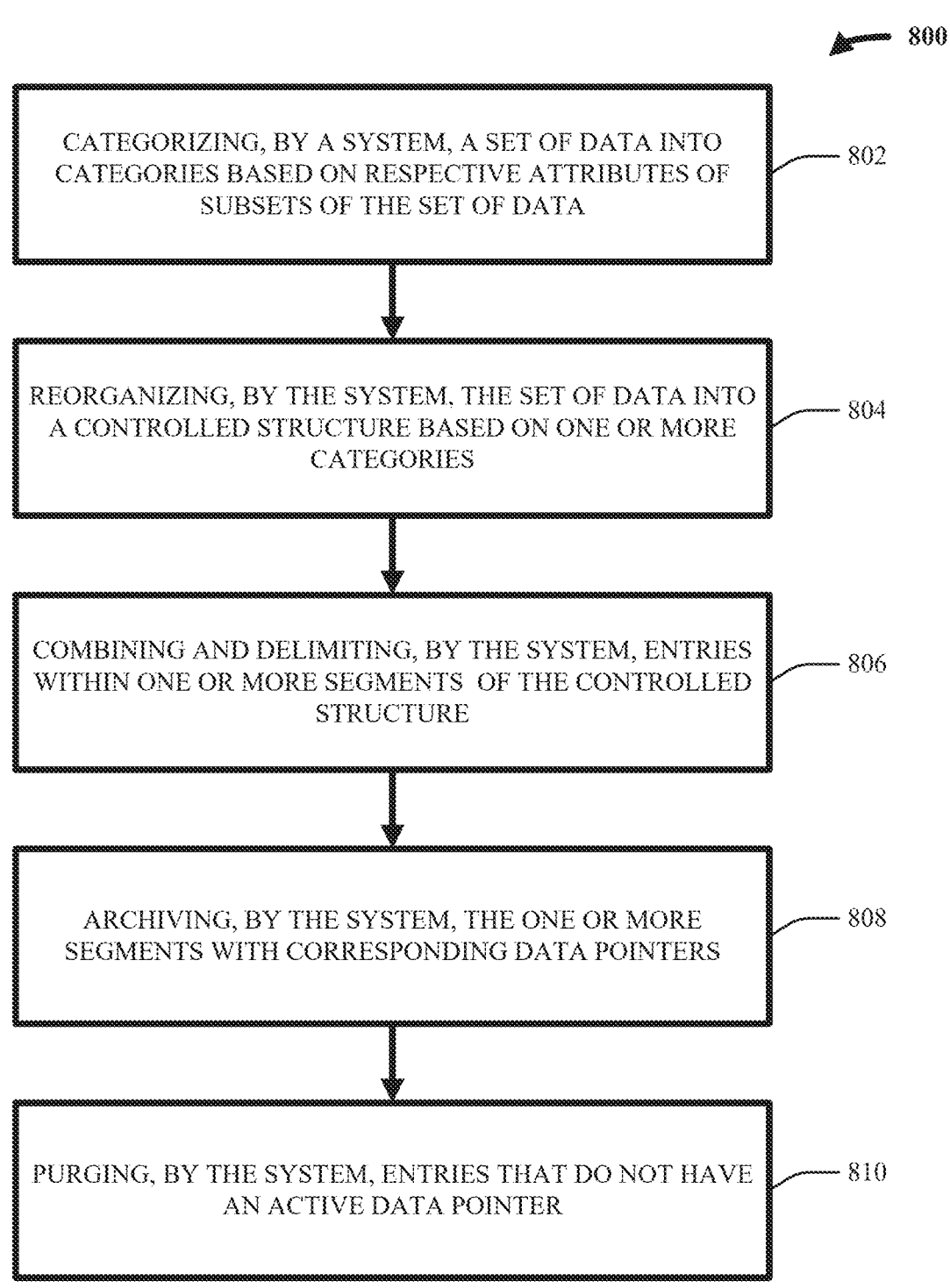
FIGS. 8 and 9 illustrate flow diagrams of example, non-limiting, computer implemented methods that facilitate generation and archiving a controlled data structure in accordance with one or more embodiments described herein.

FIG. 8 illustrates a flow diagram of an example, non-limiting, computer implemented method 800 that facilitates generation and archiving a controlled data structure in accordance with one or more embodiments described herein. Repetitive description of like elements employed in other embodiments described herein is omitted for sake of brevity.

At 802, method 800 can comprise categorizing, by a system (e.g., system 102 and/or categorizer component 104) operatively coupled to a processor (e.g., processor 106), a set of data into attributes of subsets of the set of data. For example, as described above in relation to FIG. 1, categorizer component 104 can categorize fields of a data table based on attributes such as fields that are frequently queried, fields that are frequently accessed, fields that are minimally changing, and/or fields that are never accessed.

At 804, method 800 can comprise reorganizing, by the system (e.g., system 102 and/or reorganizer component 110), the set of data into a controlled structure based on the one or more categories. For example, as described above in relation to FIG. 1, segments can be created based on the attributes of the subsets of the set of data, and the subsets can be sorted into segments based on the categories. In a further example, reorganizer component 110 can reorganize data fields from one segment to another based on entity specified percentiles for one or more of the categories. In some embodiments, one or more segments can be further split into subsegments. For example, the second segment can be split into multiple subsegments (e.g., C.Seq-2-z) wherein z is the number of subsegments.

At 806, method 800 can comprise combining and delimiting, by the system (e.g., system 102 and/or combiner component 112), entries within one or more segments of the controlled structure. For example, delimiting tokens or characters can be added between fields in a category and then the fields within the segment can be combined together into a single storage block. In this manner, a whole segment can be stored together allowing for more efficient use of storage space.

At 808, method 800 can comprise archiving, by the system (e.g., system 102 and/or combiner component 112) the one or more segments with corresponding data pointers. For example, as described above in relation to FIG. 1, combiner component 112 can add pointers to one or more segments to create a linkage between the segments of the controlled structure when the segments are stored in a database. These pointers then allow for a search of the entire controlled structure, even if segments of the controlled structure are stored in different memory storage devices.

At 810, method 800 can comprise purging by the system, (e.g., system 102 and/or combiner component 112), entries in the database that do not have an active data pointer. As all the segments within the controlled structure will have an active data pointer, any data without a pointer can then be deleted in order to remove unused or duplicated data.

Figure 9:
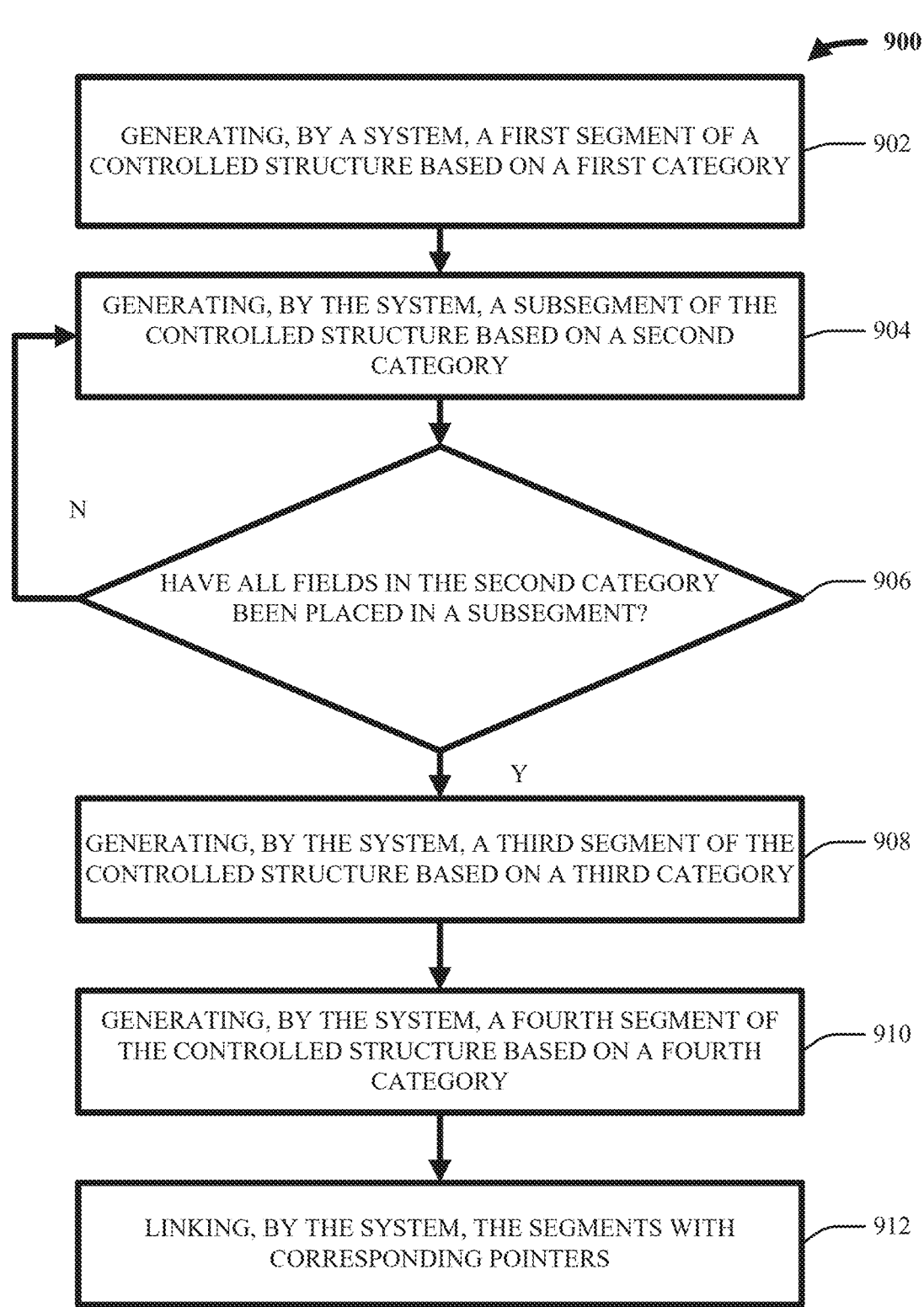

FIG. 9 illustrates a flow diagram of an example, non-limiting, computer implemented method 900 that facilitates generation and archiving a controlled data structure in accordance with one or more embodiments described herein. Repetitive description of like elements employed in other embodiments described herein is omitted for sake of brevity.

At 902, method 900 can comprise generating, by a system (e.g., system 102) operatively coupled to a processor (e.g., processor 106), a first segment of a controlled structure based on a first category. For example, as described above in reference to FIG. 1, fields of a table can be sorted into categories, based on attributes of the fields determined from usage data. For example, fields that have a frequently queried attribute can be assigned to the first category. The fields in the first category can then be combined and delimited to fit multiple fields into a single memory block, thus creating the first segment.

At 904, method 900 can comprise generating, by the system (e.g., system 102), a subsegment of the controlled structure based on a second category. For example, as described above in relation to FIG. 1, the second category (e.g., fields with a frequently accessed attribute) may contain more fields than can fit in a single segment. Accordingly, the fields in the second category can be listed from most probable to be accessed to least probable to be accessed, relative to one and other. The top X number of fields can then be used to generate a subsegment by combining and delimiting one or more fields in a single memory block and those X number of fields can then be removed from the list of fields in the second category.

At 906, method 900 can comprise determining, by the system (e.g., system 102), if all fields in the second category have been placed into a subsegment. In response to a NO determination, method 900 can return to step 904 and the next X number of fields in the second category can be used to generate an additional subsegment of the second category. In response to a YES determination, method 900 can proceed to step 908. In this manner, method 900 can repeat steps 904 and 906 until all fields within the second category have been added to a subsegment.

At 908, method 900 can comprise generating, by the system (e.g., system 102), a third segment of the controlled structure based on a third category. For example, as described above in relation to FIG. 1, a third segment can be generated using fields from a third category, wherein the third category comprises fields that have a minimally changing attribute.

At 910, method 900 can comprise generating, by the system (e.g., system 102), a fourth segment of the controlled structure based on a fourth category. For example, as described above in relation to FIG. 1, a fourth segment can be generated using fields from a fourth category, wherein the fourth category comprises fields that have a never accessed attribute.

At 912, method 900 can comprise linking, by the system (e.g., system 102), the segments with corresponding pointers. For example, as described above in reference to FIG. 1, the first segment can comprise a pointer that points to the first subsegment of the second category, the respective subsegments of the second category can comprise pointers that point to the next subsegment of the second category, the last subsegment of the second category can comprise a pointer that points to the third category, and the third category can comprise a pointer that points to the fourth category. In one or more embodiments, an index for the first segment can also be generated to facilitate lookup of the first segment. Accordingly, a single search can still parse the entirety of the controlled structure, even if portions of the controlled structure are stored on different memory devices.

System 102 provides technical improvements to hardware associated with system 102. For example, by organizing the data fields from most likely to be queried to least likely to be queried, the number of operations performed by a processor during query operations is decreased, as there is high percentage chance the quired field will be found earlier in the list, thereby decreasing the workload of the processor. Furthermore, by storing segments comprising multiple fields into single memory blocks, as opposed to storing each field in its own memory block, the overall amount of storage required to archive all the fields is reduced, thereby reducing the workload of a memory unit utilized to store the controlled structure. Additionally, the use of the linking structure between the segments of the controlled structure allows for the segments to be stored in different memory units of a system, thereby allowing for the use of multiple smaller memory units rather than larger memory units.

A practical application of system 102 is that it allows for improved entity experience when interfacing with a database. For example, by organizing the controlled structure from data fields that are most likely to be queried to least likely to be queried, commonly searched fields will be found faster during usage of the data base, thereby improving the speed at which a user interfaces with the database.

It is to be appreciated that system 102 can utilize various combination of electrical components, mechanical components, and circuitry that cannot be replicated in the mind of a human or performed by a human as the various operations that can be executed by system 102 and/or components thereof as described herein are operations that are greater than the capability of a human mind. For instance, the amount of data processed, the speed of processing such data, or the types of data processed by system 102 over a certain period of time can be greater, faster, or different than the amount, speed, or data type that can be processed by a human mind over the same period of time. According to several embodiments, system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that system 102 can include information that is impossible to obtain manually by an entity, such as a human user. For example, the type, amount, and/or variety of information included in system 102 can be more complex than information obtained manually by an entity, such as a human user.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the archive generation code 1080. In addition to block 1080, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1080, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method can be distributed among multiple computers and/or between multiple locations. On the other hand, in this presentation of computing environment 1000, detailed discussion is focused on a single computer, specifically computer 1001, to keep the presentation as simple as possible. Computer 1001 can be located in a cloud, even though it is not shown in a cloud in FIG. 10. On the other hand, computer 1001 is not required to be in a cloud except to any extent as can be affirmatively indicated.

PROCESSOR SET 1010 includes one, or more, computer processors of any type now known or to be developed in the future. Processing circuitry 1020 can be distributed over multiple packages, for example, multiple, coordinated integrated circuit chips. Processing circuitry 1020 can implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set can be located "off chip." In some computing environments, processor set 1010 can be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods can be stored in block 1080 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory can be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 can be a read only memory (ROM), but typically at least a portion of the persistent storage allows writing of data, deletion of data and re-writing of data. Some familiar forms of persistent storage include magnetic disks and solid-state storage devices. Operating system 1022 can take several forms, such as various known proprietary operating systems or open-source Portable Operating System Interface type operating systems that employ a kernel. The code included in block 1080 typically includes at least some of the computer code involved in performing the inventive methods.

PERIPHERAL DEVICE SET 1014 includes the set of peripheral devices of computer 1001. Data communication connections between the peripheral devices and the other components of computer 1001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 can include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 can be persistent and/or volatile. In some embodiments, storage 1024 can take the form of a quantum computing storage device for storing data in the form of qubits. In embodiments where computer 1001 is required to have a large amount of storage (for example, where computer 1001 locally stores and manages a large database) then this storage can be provided by peripheral storage devices designed for storing large amounts of data, such as a storage area network (SAN) that is shared by multiple, geographically distributed computers. IoT sensor set 1025 is made up of sensors that can be used in Internet of Things applications. For example, one sensor can be a thermometer and another sensor can be a motion detector.

NETWORK MODULE 1015 is the collection of computer software, hardware, and firmware that allows computer 1001 to communicate with other computers through WAN 1002. Network module 1015 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001) and can take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 can be a client device, such as thin client, heavy client, mainframe computer and/or desktop computer.

REMOTE SERVER 1004 is any computer system that serves at least some data and/or functionality to computer 1001. Remote server 1004 can be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data can be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs can be stored as images and can be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware and firmware allowing public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:
a memory that stores computer executable components;
a processor that executes the computer executable components stored in the memory,
wherein the computer executable components comprise:
a database component that determines usage metrics for a set of data;
a categorizer component that categorizes the set of data into categories based on one or more respective attributes of subsets of the set of data, wherein the one or more attributes comprise a modification rate and a frequently queried attribute, and wherein the categorizer component further assigns the one or more respective attributes of the subsets of the set of data based on the usage metrics;
a reorganizer component that reorganizes the set of data into a controlled structure based on one or more categories, wherein entries of set of data are organized from highest frequently queried attribute to lowest frequently queried attribute; and
a combiner component that combines two or more entries of the set of data within one or more segments of the controlled structure, wherein the combiner component combines the two or more entries of the set of data within one or more segments of the controlled structure by:
determining memory usage of a first entry within the segments of the controlled structure and memory usage of a second entry within the segments of the controlled structure;
determining that a combination of the memory usage of the first entry and memory usage of the second entry is less than storage space of a single memory block;
appending a delimiter token to an end of the first entry;
concatenating the first entry, the delimiter token, and the second entry into a combined entry;
and stores the combined entry within the single memory block.

2. The system of claim 1, wherein the combiner component further archives the one or more segments with corresponding data pointers.

3. The system of claim 2, wherein the combiner component further purges entries that do not have an active data pointer.

4. The system of claim 1, wherein the one or more attributes further comprise at least one of a frequently accessed attribute, a never accessed attribute, and an infrequently changing attribute.

5. The system of claim 4, wherein the frequently queried data attribute is based on where clause statistics.

6. The system of claim 4, wherein the frequently accessed attribute is based on selected query fields.

7. The system of claim 1, wherein data within the controlled structure is organized from most likely to be accessed to least likely to be accessed.

8. A computer-implemented method comprising:
determining, by a system operatively coupled to a processor, usage metrics for a set of data;
assigning, by the system, one or more respective attributes of subsets of the set of data based on the usage metrics;
categorizing, by the system, the set of data into categories based on the one or more respective attributes of the subsets of the set of data, wherein the one or more attributes comprise a modification rate of the set of data and a frequently queried attribute;
reorganizing, by the system, the set of data into a controlled structure based on one or more categories, wherein entries of set of data are organized from highest frequently queried attribute to lowest frequently queried attribute;
combining, by the system, two or more entries within one or more segments of the controlled structure, wherein the combining comprises:
measuring, by the system, memory usage of a first entry within the segments of the controlled structure and memory usage of a second entry within the segments of the controlled structure;

determining, by the system, that a combination of the memory usage of the first entry and memory usage of the second entry is less than storage space of a single memory block;

appending, by the system, a delimiter token to an end of the first entry; and concatenating, by the system, the first entry, the delimiter token, and the second entry into a combined entry;

and storing, by the system, the combined entry within a single memory block.

9. The computer-implemented method of claim 8, further comprising archiving, by the system, the one or more segments with corresponding data pointers.

10. The computer-implemented method of claim 9, further comprising purging, by the system, entries that do not have an active data pointer.

11. The computer-implemented method of claim 8, wherein the one or more attributes further comprise at least one of a frequently accessed attribute, a never accessed attribute, and an infrequently changing attribute.

12. The computer-implemented method of claim 11, wherein the frequently queried data attribute is based on where clause statistics.

13. The computer-implemented method of claim 11, wherein the frequently accessed attribute is based on selected query fields.

14. The computer-implemented method of claim 8, wherein data within the controlled structure is organized from most likely to be accessed to least likely to be accessed.

15. A computer program product, the computer program product comprising a computer readable storage medium having program instructions embodied therewith, the program instructions executable by a processor to cause the processor to:

determine, by the processor, usage metrics for a set of data;

assign, by the processor, one or more respective attributes of subsets of the set of data based on the usage metrics;

categorize, by the processor, the set of data into categories based on the one or more respective attributes of the subsets of the set of data, wherein the one or more attributes comprise a modification rate of the set of data and a frequently queried attribute;

reorganize, by the processor, the set of data into a controlled structure based on one or more categories, wherein entries of set of data are organized from highest frequently queried attribute to lowest frequently queried attribute;

combine by the processor, two or more entries within one or more segments of the controlled structure wherein the combining causes the processor to:

measure, by the processor, memory usage of a first entry within the segments of the controlled structure and memory usage of a second entry within the segments of the controlled structure;

determine, by the processor, that a combination of the memory usage of the first entry and memory usage of the second entry is less than storage space of a single memory block;

append, by the processor, a delimiter token to an end of the first entry; and concatenate, by the processor, the first entry, the delimiter token, and the second entry into a combined entry;

and store, by the processor, the combined entries within a single memory block.

16. The computer program product of claim 15, wherein the program instructions are further executable to cause the processor to:

archive, by the processor, the one or more segments with corresponding data pointers.

17. The computer program product of claim 16, wherein the program instructions are further executable to cause the processor to:

purge, by the processor, entries that do not have an active data pointer.

18. The computer program product of claim 15, wherein the one or more attributes further comprise at least one of a frequently accessed attribute, a never accessed attribute, and an infrequently changing attribute.

19. The computer program product of claim 18, wherein the frequently queried data attribute is based on where clause statistics.

20. The computer program product of claim 15, wherein data within the controlled structure is organized from most likely to be accessed to least likely to be accessed.

* * * * *